United States Patent [19]
Peyrard

[11] 3,905,248
[45] Sept. 16, 1975

[54] FRONT CHAIN-WHEEL ARRANGEMENT FOR BICYCLES

[76] Inventor: Marcel Peyrard, 6 Avenue Jules Ferry, Saint-Chamond (Loire), France

[22] Filed: Feb. 22, 1974

[21] Appl. No.: 444,995

[30] Foreign Application Priority Data
Feb. 23, 1973 France .............. 73.07417

[52] U.S. Cl. ............... 74/243 R; 74/594.2; 74/240
[51] Int. Cl.² ................ F16H 7/18; F16H 55/30
[58] Field of Search .......... 74/243 R, 217 B, 594.1, 74/594.2, 609, 611, 240

[56] References Cited
UNITED STATES PATENTS
3,550,465  12/1970  Maeda ............................ 74/611

FOREIGN PATENTS OR APPLICATIONS
431,528  7/1933  United Kingdom .............. 74/594.2
276,894  7/1951  France ............................. 74/594.2

Primary Examiner—Samuel Scott
Assistant Examiner—Allan R. Burke
Attorney, Agent, or Firm—Sughrue, Rothwell, Mion, Zinn and Macpeak

[57] ABSTRACT

The invention relates to a plural sprocket crank gear for a chain driven bicycle. The crank gear includes at least two chain wheels disposed side-by-side with a frusto-conical surface integral with the larger of the two wheels and interposed between the teeth of the two wheels in order to facilitate the transfer of the chain from one wheel to the other.

8 Claims, 7 Drawing Figures

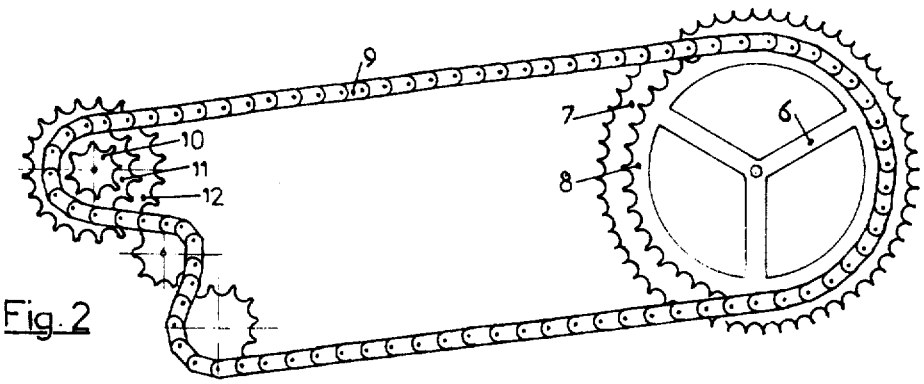
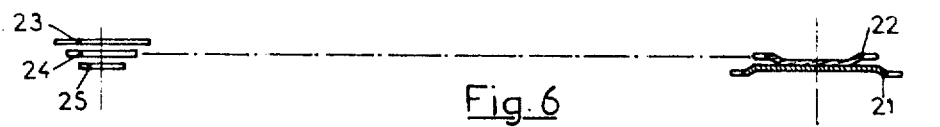
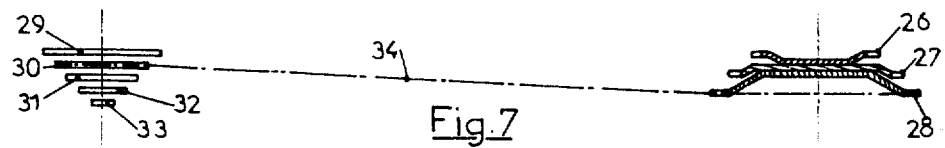
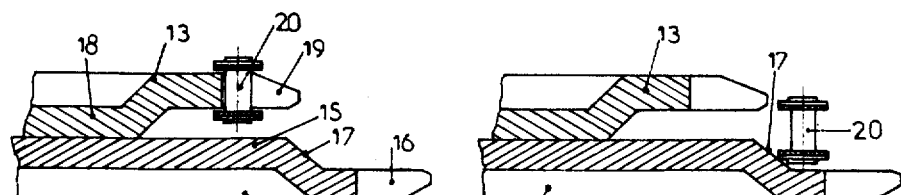
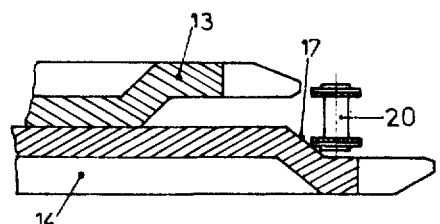
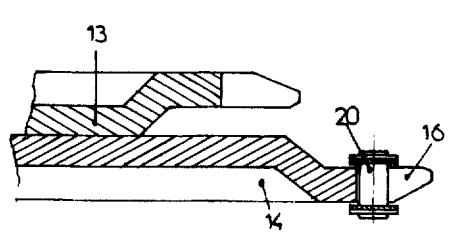
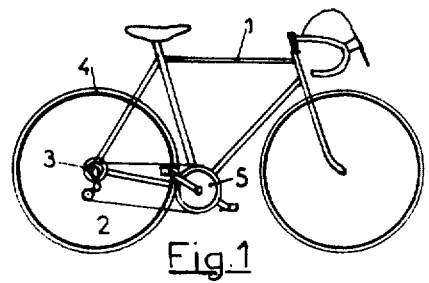

FRONT CHAIN-WHEEL ARRANGEMENT FOR BICYCLES

The present invention relates to a chain drive crank gear with several sprockets, in particular for bicycles.

Crank gear arrangements having several sprockets are already known, which allow increasing the number of speed changes in a bicycle. In said known arrangements, the crank gear is connected to the sprockets of the driving wheel by a chain. The gear changes are obtained through a "jump" of the chain, the latter being operated by a device commonly known as "deraillour," and passing from one rear sprocket to another having a different pitch diameter.

By adding a crank gear arrangement having a number of chain wheels, it is possible to increase the number of speed changes, the chain "jumping" from one chain wheel to another having a different pitch diameter.

The known embodiments of such arrangements have many drawbacks. The chain wheels of the crank gear are flat, so that they can be mounted with a spacer therebetween to allow the chain to pass from one wheel to another. Such a disposition has a major drawback, in particular when the number of sprockets on the driving wheel is great: in fact, the greater the number of sprockets, the greater the extent to which the chain line is distorted, in particular when the chain lies on the outermost sprockets on the driving wheel, as it is then very difficult for said chain to jump from one chain wheel of the crank gear to another.

Said known embodiments have still another drawback, in that they require using steel sheeting which is thick enough to obtain a satisfactory inertia in the chain wheels. In addition to the resulting increase in weight, the use of thick sheeting requires machining the thickness of the teeth to allow using standard chains. In a more general way, this type of arrangement is expensive, and tends to increase the weight of the bicycle provided therewith.

The object of the present invention is to obviate said drawbacks, and provide a multi-chain wheel crank gear which improves the shifting of the chain, while substantially reducing the weight of the crank gear and the cost price thereof.

According to a further feature of the invention, the jumping of the chain from one wheel to another is furthered by the frusto-conical shape given to the hubs of said chain wheels. The diameter of the top of the frustum of cone of the greater chain wheel has a size which is intermediate between the winding diameter of the chain on the smaller chain wheel and the winding diameter of the chain on the greater chain wheel.

The side of said frustum of cone acts as an intermediate position during the jump by the chain from one chain wheel to the other, so that the chain is guided.

According to another feature of the invention, the frusto-conical shape of the sides of the chain wheels allows, by assembling said wheels without any spacers, obtaining directly an adequate spacing between the sets of teeth of each wheel, while taking into account the width of the type of chain used.

According to a further feature of the invention, assembling the chain wheels without using any spacers results in a lower cost and affords many possible practical applications.

According to a further feature of the invention, the special shape given to the chain wheels increases the inertia of the latter, so that it is possible to use thinner steel sheeting, the thickness of which is advantageously equal to the width of the standardized teeth, whereby any extra machining is dispensed with.

The accompanying drawing, given by way of non-limiting example, will allow understanding the features of the invention more clearly.

FIG. 1 illustrates schematically a chain drive bicycle of a known type.

FIG. 2 is a detailed view of a chain drive with several gear changes.

FIG. 3 illustrates an example of a crank gear with two chain wheel according to the invention, the chain meshing with the smaller chain wheel.

FIG. 4 shows the chain in its intermediate position at the time it jumps from one chain wheel to the other.

FIG. 5 shows a crank gear according to the invention, the chain being meshed with the greater chain wheel.

FIG. 6 shows the principle of operation of a crank gear according to the invention.

FIG. 7 shows how the invention is used in a more complex instance.

FIG. 1 shows a bicycle 1, provided with a chain drive 2 with sprockets 3 on the driving wheel 4, and a driving crank gear 5.

FIG. 2 illustrates a driving crank gear 6 comprising the chain wheels 7 and 8, a transmission chain 9, and sprockets 10, 11, 12.

Through the possible driving combinations by the chain, between the chain wheels 7 and 8, on the one hand, and the sprockets 10, 11, and 12, on the other hand, there is thus obtained a six-speed transmission.

FIG. 3 is a sectional view of a crank gear according to the invention, with two chain wheels 13 and 14.

The hub 15 of the chain wheel 14 is offset towards the teeth of the chain wheel 13 with respect to its own teeth 16. Such offsetting is obtained by giving a frusto-conical shape to the side 17 of the chain wheel 14. In the same way, the hub 18 of the chain wheel 13 is offset towards the teeth of the chain wheel 14 with respect to its own teeth 19. The chain 20 meshes with the smaller chain wheel 13.

FIG. 4 is a sectional view, similar to FIG. 5, but showing the chain 20 being guided by the side 17 of the chain wheel 14 during the jump of said chain from the chain wheel 13 to the chain wheel 14, or conversely.

FIG. 5 shows again a similar sectional view of the crank gear with two plates 13, and 14, the chain now meshing with the teeth 16 of the chain wheel 14.

FIG. 6 illustrates diagrammatically a transmission according to the invention, which affords six speeds through the action of a crank gear with two chain wheels 21, 22 according to the invention, and of three sprockets 23, 24, 25.

FIG. 7 illustrates diagrammatically a transmission of the same type as in FIG. 6, but using a crank gear with three chain wheels 26, 27, 28, and five sprockets 29, 30, 31, 32, 33, whereby the transmission has available fifteen speeds.

In this latter case, it is obvious that the chain line 34 is necessarily submitted to substantial deformations, in particular when the meshing takes place on the sprocket 29 and the chain wheel 28, or between the sprocket 33 and the chain wheel 26, which distorts the chain line to a great extent, and makes it more difficult for the chain to jump from one chain wheel to the other, in any known embodiment. In contradistinction, the special shape given to the chain wheels according to the invention allows guiding the chain during its movement from one chain wheel to another, and making it easier for said chain to jump in spite of the great number of sprockets.

I claim:

1. A multi-step toothed wheel for driving a chain, including at least one great toothed ring and one small toothed ring which are mounted side by side to rotate about the same axis, characterized in that a frusto-conical surface is provided between the two rings, the smaller base of said surface being close to the small ring and having a diameter lower than that of the circumference defined by the tips of the teeth of said small ring, while the greater base of said frusto-conical surface lies against the great ring and has a diameter higher than that of the above-mentioned circumference which ideally interconnects the peripheral tips of the teeth of the small ring, so that said frusto-conical surface acts as a guide for the chain when the latter jumps from one ring to the other, said frusto-conical surface is of integral one-piece construction with the great ring to provide a transition between a central hub of the great ring and the peripheral teeth thereof.

2. A toothed wheel according to claim 1 characterized in that the great ring is obtained from a stamped plate, while the flat central hub of said ring lies in a plane which is offset towards the small plate with respect to the plane of the peripheral teeth of the great ring.

3. A toothed wheel according to claim 1 characterized in that the small ring is produced from a stamped plate to define a flat central hub, the plane of which is offset towards the great ring with respect to the peripheral teeth of the small ring.

4. A toothed wheel according to claim 3 characterized in that the two rings are directly coupled, without any intermediate spacer, by fixing the hub of the small ring directly against the hub of the great ring.

5. A toothed wheel according to claim 1 characterized in that each of the stamped rings is produced from a plate, the thickness of which is lower than that a flat ring according to the prior art would have.

6. A toothed wheel according to claim 3 characterized in that, between the great ring and the small ring, it includes, besides, an intermediate ring, the flat hub of which is surrounded by a frusto-conical surface which ensures its connection with the peripheral teeth, said intermediate ring being mounted in a manner such that the smaller base of its frusto-conical surface is close to the small ring, while the greater base of said frusto-conical surface is close to the great ring.

7. A toothed wheel according to claim 6, characterized in that the three flat hubs of the rings are applied and secured directly on one another, the hub of the intermediate ring being located between the respective hubs of the great ring and the small ring.

8. A toothed wheel according to claim 6 characterized in that the hubs of the rings are assembled together by spot welding.

* * * * *